US008854435B2

(12) United States Patent
Grafulla-Gonzalez et al.

(10) Patent No.: US 8,854,435 B2
(45) Date of Patent: Oct. 7, 2014

(54) VIEWPOINT NAVIGATION

(75) Inventors: Beatriz Grafulla-Gonzalez, Lund (SE); Martin Pettersson, Vallentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 371 days.

(21) Appl. No.: 13/182,507

(22) Filed: Jul. 14, 2011

(65) Prior Publication Data

US 2012/0057002 A1 Mar. 8, 2012

Related U.S. Application Data

(60) Provisional application No. 61/382,644, filed on Sep. 14, 2010.

(30) Foreign Application Priority Data

Sep. 6, 2010 (EP) .................................... 10175440

(51) Int. Cl.
*H04N 13/04* (2006.01)
*H04N 21/432* (2011.01)
*H04N 13/00* (2006.01)
*H04N 19/597* (2014.01)
*H04N 5/228* (2006.01)

(52) U.S. Cl.
CPC .......... *H04N 21/4325* (2013.01); *H04N 5/228* (2013.01); *H04N 13/0044* (2013.01); *H04N 19/00769* (2013.01)
USPC .......................................... 348/51; 348/208.4

(58) Field of Classification Search
CPC .......... H04N 13/0497; H04N 13/0404; H04N 13/0409; H04N 13/0422; H04N 13/04; H04N 9/80; H04N 5/228; H04N 5/85; H04N 9/8042; G02B 27/2214; G09G 5/00; G11B 27/105
USPC .............. 348/51, E13.026, 47, E13.075, 239, 348/207, 333.12; 386/241, E5.003, 386/E5.0026
See application file for complete search history.

(56) References Cited

U.S. PATENT DOCUMENTS

| 6,061,083 | A | * | 5/2000 | Aritake et al. ................... 348/51 |
| 2002/0188943 | A1 | | 12/2002 | Freeman et al. |
| 2004/0011981 | A1 | | 1/2004 | Ahn |
| 2005/0117019 | A1 | | 6/2005 | Lamboray et al. |
| 2006/0023782 | A1 | * | 2/2006 | Cai et al. ................... 375/240.03 |

(Continued)

FOREIGN PATENT DOCUMENTS

| EP | 0838787 | A2 | 4/1998 |
| EP | 1785941 | A1 | 5/2007 |

(Continued)

OTHER PUBLICATIONS

Ekmekcioglu et al., "Low-Delay Random View Access in Multi-View Coding Using a Bit-Rate Adaptive Downsampling Approach," IEEE International Conference on Multimedia and Expo, Jun. 23, 2008, pp. 745-748, IEEE, Hannover.

(Continued)

*Primary Examiner* — Dave Czekaj
*Assistant Examiner* — Dramos I Kalapodas
(74) *Attorney, Agent, or Firm* — Coats & Bennett, P.L.L.C.

(57) ABSTRACT

Viewer interaction herein triggers switching from a first view point to a second view point and thereby controls presentation of video sequences. Each video sequence comprises a sequence of images of one and the same subject and is associated with a respective view point. Images are obtained from a first video sequence associated with a first view point and are provided for presentation. Viewer input information is received that indicates a desire to present a second view point. In response, a start position within a second video sequence associated with the second view point is determined, and the obtaining of images from the first video sequence is discontinued as of the determined start position. Images are then obtained from the second video sequence associated with the second view point, starting from the determined start position, and are then provided for presentation.

15 Claims, 6 Drawing Sheets

(56) References Cited

U.S. PATENT DOCUMENTS

| | | |
|---|---|---|
| 2006/0028489 A1* | 2/2006 | Uyttendaele et al. ......... 345/646 |
| 2007/0022379 A1 | 1/2007 | Hara et al. |
| 2007/0211149 A1* | 9/2007 | Burtnyk et al. ............ 348/208.4 |
| 2009/0079818 A1* | 3/2009 | Saishu et al. ................... 348/51 |
| 2010/0232767 A1* | 9/2010 | Sasaki et al. .................. 386/108 |
| 2010/0245548 A1* | 9/2010 | Sasaki et al. ................... 348/51 |

FOREIGN PATENT DOCUMENTS

| | | |
|---|---|---|
| EP | 2150065 A2 | 2/2010 |
| GB | 2457690 A | 8/2009 |
| WO | 96/21321 A1 | 7/1996 |
| WO | 02/45001 A1 | 6/2002 |
| WO | 2010/005149 A1 | 1/2010 |
| WO | 2010/037512 A1 | 4/2010 |

OTHER PUBLICATIONS

Kim et al., "Real-Time Synchronous Multi-View Video Transport System over IP Networks," IEEE Transactions on Consumer Electronics, May 2008, pp. 460-467, vol. 54, No. 2, IEEE.

* cited by examiner

VIEWPOINT NAVIGATION

RELATED APPLICATIONS

This application claims priority from European Patent Application Serial Number EP10175440, 6 filed Sep. 6, 2010, and from U.S. Provisional Patent Application Ser. No. 61/382,644, filed Sep. 14, 2010, each of which is incorporated herein by reference in its entirety.

TECHNICAL FIELD

The present disclosure relates to digital multi-view point video and in particular to controlling presentation of digital multi-view point video sequences.

BACKGROUND

The progress in fields such as computing power of digital processors, storage capacity of memory devices and communication bandwidth of transmission channels is evident in many areas of modern enterprise; not least in the field of video presentation. For example, it is now possible to provide and present 3D films on widely available display devices capable of rendering 3D as well as 2D video streams.

Closely related to 3D video is the concept of multi-view point video. A multi-view point video presentation system involves components that are capable of presenting several different view points of a scene or a subject to a viewer. The different view points may be 2D video sequences as well as 3D video sequences. In order to provide an optimal viewer experience it is desirable to provide the viewer with the capability of switching from a first view point to a second view point. The viewer interaction may for example comprise of head/marker/color tracking using a video camera, or input from a mouse or a keyboard, However, by providing such viewer interaction a number of challenges become noticeable. For example, when switching from a first view point to a second view point it is desirable to obtain a smooth transition with minimal delay and non-existence of frame freezing. Generally, these challenges have not been addressed in the prior art in other ways than the obvious increase of computing power and throughput in the rendering systems. In fact, prior art typically addresses problems of how to efficiently compute interpolated video sequences that represent view points other than those that have been recorded.

SUMMARY

It is therefore an object of the present disclosure to obviate at least some of the above disadvantages and provide an improved method of controlling presentation of video sequences.

This object is achieved, in a first aspect, by providing a method of controlling presentation of video sequences, each video sequence comprising a sequence of images of one and the same subject. Each video sequence is associated with a respective view point and each video sequence is stored in a respective video sequence storage container.

Images are obtained from a first video sequence associated with a first view point and these obtained images are provided, e.g. to a rendering system, for presentation. Viewer input information is received, e.g. from a user or viewer, that indicates a desire to present a second view point. In response to receiving the viewer input information, a start position within a second video sequence associated with the second view point is determined, and the obtaining of images from the first video sequence is discontinued as of the determined start position. Images are then obtained from the second video sequence associated with the second view point, starting from the determined start position, and these obtained images from the second video sequence is then provided for presentation.

In other words, a method is provided where viewer interaction triggers switching from a first view point to a second view point. Irrespective of whether only two view points are considered or any number of view points, i.e. continuous transitions, are considered, such a method provides smooth transitions with minimal delay and non-existence of frame freezing.

Embodiments include those wherein a first source processing process and a rendering process are concurrently active, and wherein in the first source processing process, the images from the first video sequence are obtained, in the rendering process, the images from the first video sequence are rendered, in the first source processing process, the viewer input information is received, in the first source processing process, the viewer input information is analyzed, comprising the determination of the start position within the second video sequence, in the first source processing process, the obtaining of images from the first video sequence is discontinued, in the first source processing process, the images from the second video sequence are obtained, and in the rendering process, the images from the second video sequence are rendered.

In other words, such embodiments provide an interactive video player with a single source processing process per displayed output view point and user input capabilities and which provides quick and smooth view transitions. An output view point is here defined as an input to a view arrangement process. For example, displayed 2D video has one output view point while displayed 3D stereo video has two output view points.

Embodiments include those wherein a view selection process and a rendering process are concurrently active, and wherein in the view selection process, the images from the first video sequence are obtained from a first source processing process, in the rendering process, the images from the first video sequence are rendered, in the view selection process, the viewer input information is received, in the view selection process, the viewer input information is analyzed, comprising the determination of the start position within the second video sequence, in the view selection process, the obtaining of images from the first video sequence is discontinued, in the view selection process, the images from the second video sequence are obtained from a second source processing process, and in the rendering process, the images from the second video sequence are rendered.

In other words, such embodiments provide interactive view transitions that are performed in a quick and smooth way in a video player having multiple source processing processes, and a view selection process. A user interface is connected to the view selection process to determine which views should be displayed. The view selection process requests ("pulls") image data from the source reading processes containing the currently selected view point.

The object is also achieved, in a second aspect, by providing a computer program for controlling presentation of video sequences, each video sequence comprising a sequence of images of one and the same subject. Each video sequence is associated with a respective view point and each video sequence is stored in a respective video sequence storage container.

The computer program comprises software instructions that, when executed in a computer, performs obtaining images from a first video sequence associated with a first view point, providing the obtained images from the first video sequence for presentation, receiving viewer input information indicating a desire to present a second view point, in response to receiving the viewer input information, determining a start position within a second video sequence associated with the second view point, discontinuing the obtaining of images from the first video sequence, as of the determined start position, obtaining images from the second video sequence associated with the second view point, starting from the determined start position, and providing the obtained images from the second video sequence for presentation.

The object is also achieved, in a third aspect, by providing an apparatus for controlling presentation of video sequences, each video sequence comprising a sequence of images of one and the same subject. Each video sequence is associated with a respective view point and each video sequence is stored in a respective video sequence storage container.

The apparatus comprises processing circuitry and memory circuitry that are configured to obtain images from a first video sequence associated with a first view point, provide the obtained images from the first video sequence for presentation, receive viewer input information indicating a desire to present a second view point, in response to receiving the viewer input information, determining a start position within a second video sequence associated with the second view point, discontinue the obtaining of images from the first video sequence, as of the determined start position, obtain images from the second video sequence associated with the second view, starting from the determined start position, and provide the obtained images from the second video sequence for presentation.

Effects and advantages obtained from the second and third aspects correspond to those discussed above in connection with the first aspect.

DETAILED DESCRIPTION OF EMBODIMENTS

Figure 1:
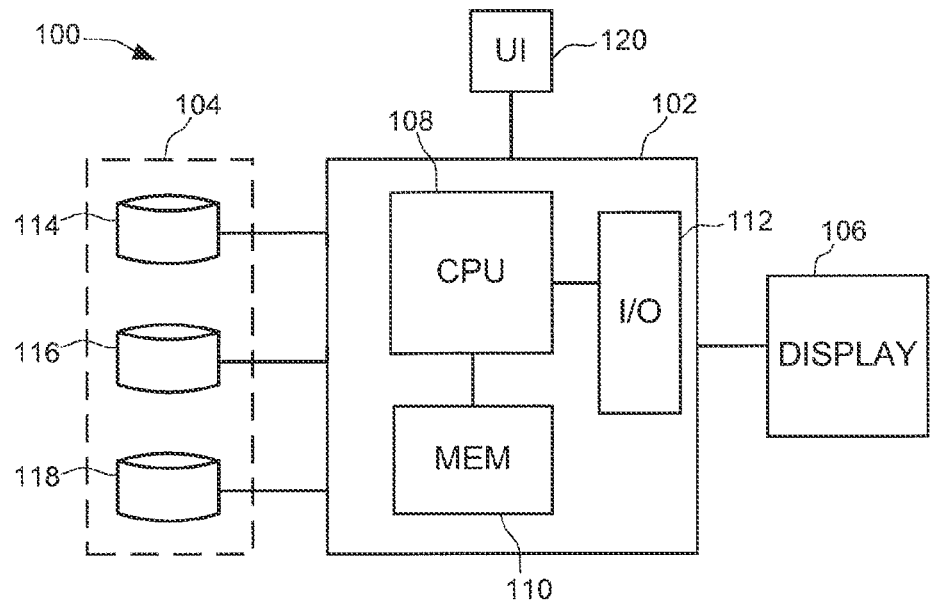
FIG. 1 is a block diagram that schematically illustrates hardware units in a video presentation system.

FIG. 1 illustrates schematically a video presentation system 100 in which the control methods summarized above and described in detail below may be realized. The system 100 comprises a main unit 102 in which a processor 108, memory circuitry 110 and input/output, I/O, circuitry 112 are arranged. An external database 104 comprises a plurality of storage units 114, 116, 118 for video sequences. A display unit 106 and a user input unit 120 also form part of the system 100. The memory circuitry 110 may contain suitable data and control software for execution by the processor 108. As the skilled person will realize, the system 100 may be, or form part of, a personal computer, a handheld device such as a mobile communication terminal, personal digital assistant or any similar device. The database 104 may be located inside such a device or be more or less remotely located, for example located in a network with which such a device communicates.

Figure 2:
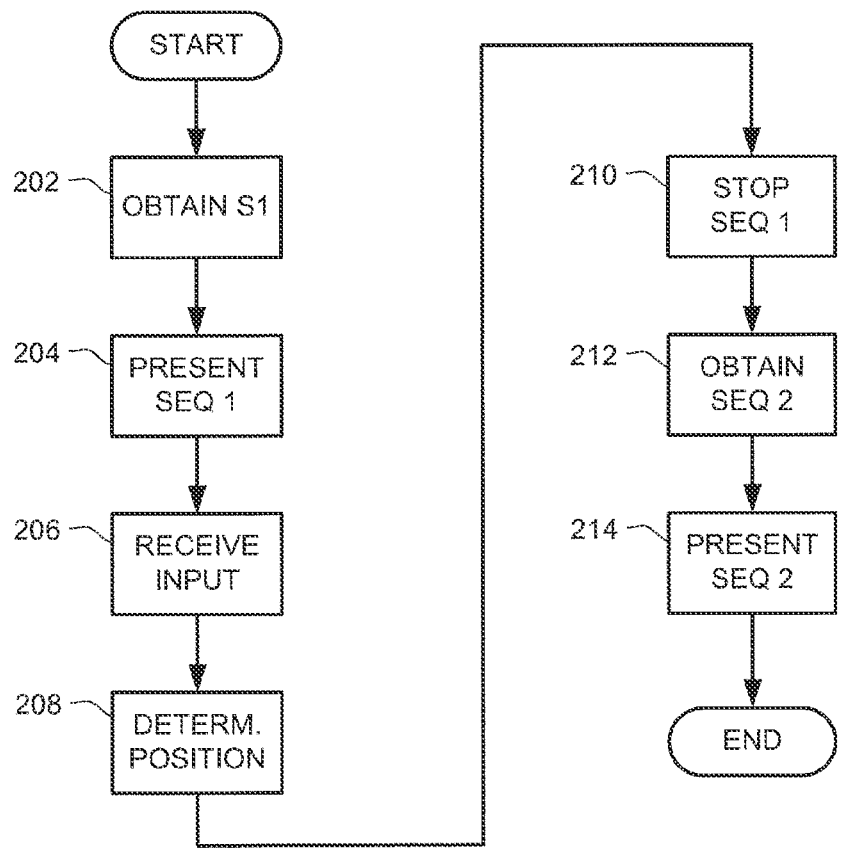
FIG. 2 is a flow chart of a video presentation control method.

FIG. 2 is a flow chart of a method of controlling presentation of video sequences as summarized above. The method may be performed by way of suitably configured software instructions executed in the system 100 illustrated in FIG. 1. Each video sequence comprises a sequence of images of one and the same subject. Each video sequence is associated with a respective view point and each video sequence is stored in a respective video sequence storage container. For example a video storage container may be in the form of a file stored in any of the storage units 114, 116, 118 in FIG. 1.

Images are obtained, in an obtaining step 202, from a first video sequence associated with a first view point and these obtained images are provided, e.g. to a rendering system, for presentation in a presentation step 204. Viewer input information is received in a reception step 206, e.g. from a user or viewer, that indicates a desire to present a second view point. For example, the reception of viewer input information may comprise receiving information regarding a movement of the viewer.

In response to receiving the viewer input information, a start position within a second video sequence associated with the second view point is determined in a determination step 208. The obtaining of images from the first video sequence is discontinued as of the determined start position in an obtain stop step 210. Images are then obtained, in an obtaining step 212, from the second video sequence associated with the second view point, starting from the determined start position, and these obtained images from the second video sequence is then provided for presentation in a presentation step 214.

An alternative way to describe controlling presentation of video sequences, i.e. an alternative to a flow chart as in FIG. 2, is by way of functional block diagrams such as those in FIGS. 3 to 9. FIGS. 3 to 9 show functional blocks of processes, or "filters" as they may also be denoted, illustrating embodiments of the control method described above in connection with FIG. 1.

Figure 3:
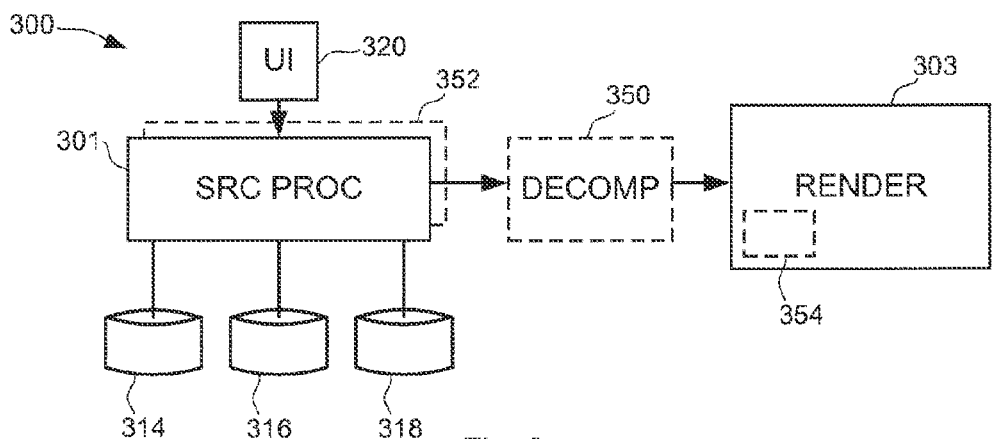
FIGS. 3 to 10 are block diagrams of functions that schematically illustrate a respective embodiment of a video presentation control method.

In FIG. 3 a source processing process 301 interacts with a rendering process 303, receives user or viewer input 320 and interacts with a first, a second and a third video sequence storage container 314, 316 and 318, respectively, as will be described in the following.

The source processing process 301, here denoted the first source processing process 301, and the rendering process 303 are concurrently active, e.g. running as so-called threads in a processor such as the processor 108 in FIG. 1. Images from a first video sequence are obtained by the first source processing process 301 from the first storage container 314. In the rendering process 303, the images from the first video sequence are rendered. In the first source processing process 301, viewer input information 320 is received. In the first source processing process 301, the viewer input information 320 is analyzed, comprising determination of the start position within a second video sequence. In the first source processing process 301, the obtaining of images from the first video sequence in the storage container 314 is discontinued. In the first source processing process 301, images from the second video sequence are obtained from the second storage container 316, and in the rendering process 303, the images from the second video sequence are rendered.

Although the source processing process of FIG. 3 only interacts with the first and the second storage container 314 and 316, respectively, it is to be noted that further interaction with any number of additional containers may occur, as indicated by the illustration of a third container 318.

The video sequences may in some embodiments be in a compressed data format. In such cases, the method further comprises a concurrently active decompression process 350. In the first source processing process 301, the determination of the start position then comprises keeping track of frame time stamps in relation to byte positions within the video sequences and, in the decompression process 350, the images from the video sequences are decompressed and provided to the rendering process 303.

Furthermore, in cases where 3D or autostereoscopic 3D viewing is to be obtained, the method may further comprise least a second source processing process 352 concurrently active with the first source processing process 301. As the skilled person will realize, in order to obtain 3D or autostereoscopic 3D viewing, it is necessary to obtain image data of at least two different view points and co-present these data in a suitably arranged 3D display unit.

That is, in such cases, handling of first and second video sequences are performed by the second source processing process 352 according to the handling in the first source processing process 301. In order to realize the 3D or autostereoscopic 3D viewing, a view arranging process 354 is included in which first video sequences from respective source processing processes 301, 352 are arranged for 3D display prior to the rendering process 303 and in which second video sequences from respective source processing processes 301, 352 are arranged for 3D display prior to the rendering process 303.

Figure 4:
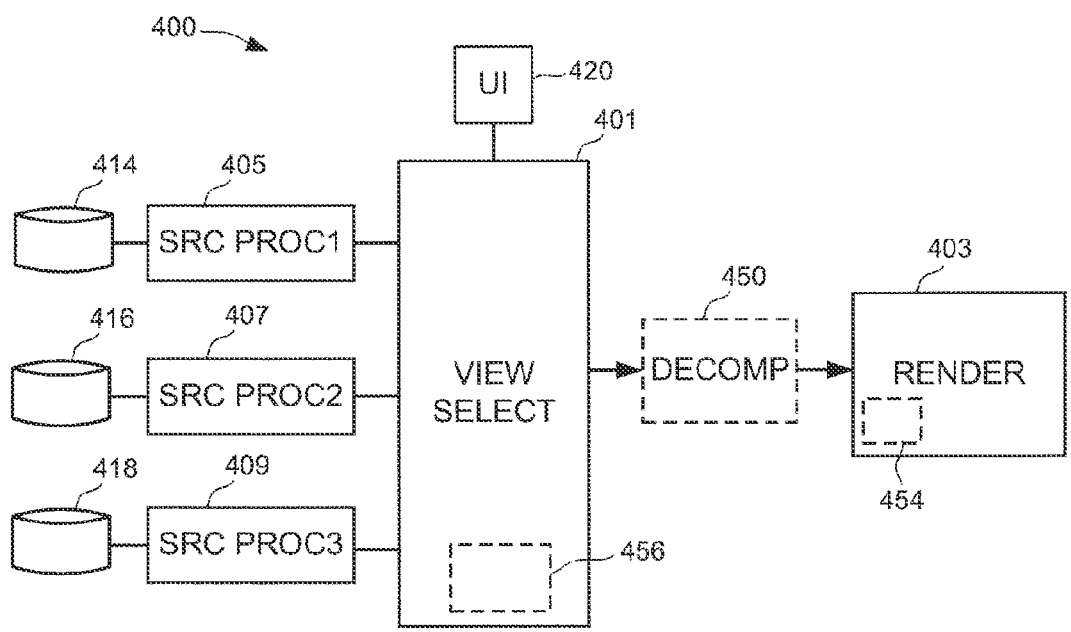

The view arranging process 354 may comprise any of: spatial interlacing, temporal interleaving and arranging for auto stereoscopic display In FIG. 4 a view selection process 401 interacts with a rendering process 403, receives user or viewer input 420 and interacts with a first, a second and a third source processing process 405, 407 and 409, respectively. The source processing processes 405, 407 and 409 interact with a respective video sequence storage container 414, 416 and 418, respectively, as will be described in the following.

The view selection process 401 and the rendering process 403 are concurrently active, e.g. running as so-called threads in a processor such as the processor 108 in FIG. 1. In the view selection process 401, images from a first video sequence are obtained from the first source processing process 405. In the rendering process 403, the images from the first video sequence are rendered. In the view selection process, the viewer input information 420 is received. In the view selection process, the viewer input information 420 is analyzed, comprising the determination of the start position within a second video sequence. In the view selection process 401, the obtaining of images from the first video sequence is discontinued. In the view selection process, images from a second video sequence are obtained from the second source processing process 416, and in the rendering process 403, the images from the second video sequence are rendered.

Although the processes of FIG. 4 only interact with the first and the second source processing processes 405 and 407, respectively, it is to be noted that further interaction with any number of additional source processing processes may occur, as indicated by the illustration of a third source processing process 409 and corresponding container 418.

Similar to the embodiments described above in connection with FIG. 3, the video sequences may in some embodiments be in a compressed data format. In such cases, in the view selection process 401, the determination of the start position may comprise keeping track of frame time stamps in relation to byte positions within the video sequence and, still in the view selection process 401, the images from the video sequences are decompressed 456 and provided to the rendering process 403. Alternatively, there may be a concurrently active decompression process 450 that performs the decompression of the video sequences and provides them to the rendering process 403.

Moreover, in cases where 3D or autostereoscopic 3D viewing is to be obtained, a plurality of execution threads may be active within the view selection process 401, the execution threads being configured to handle first and second video sequences according to the handling in the view selection process as described above. In such cases, a view arranging process 454 may be active in which first video sequences from respective execution threads are arranged for 3D display prior to the rendering process 403, and in which process 454 second video sequences from respective execution threads are arranged for 3D display prior to the rendering process 403, which may comprise any of: spatial interlacing, temporal interleaving and arranging for auto stereoscopic display.

Turning now to FIGS. 5 to 10, a number of further embodiments of methods of controlling presentation of video sequences will be described in some detail. The embodiments in FIGS. 5 to 10 will be described in terms that are familiar to the skilled person working with filters in the so-called Direct Show (DS) multimedia framework. The various DS filters to be discussed below should be construed to correspond to the processes introduced in the description above. However, as the skilled person will realize, even though the embodiments to follow are described in terms of DS filters, the embodiments may also be implemented in other ways, for example in the Media Foundation multimedia framework.

Moreover, most of the embodiments to be described below relate to stereoscopic implementations. This fact should not be interpreted as being limiting. Rather, as the appended claims define, the present disclosure covers 2D as well as 3D and autostereoscopic implementations.

In FIGS. 5 to 10, blocks represented with solid lines are filters and blocks represented with dashed lines represent input to the filters, e.g. from a higher level application program that calls upon the services provided by the filters.

Figure 5:
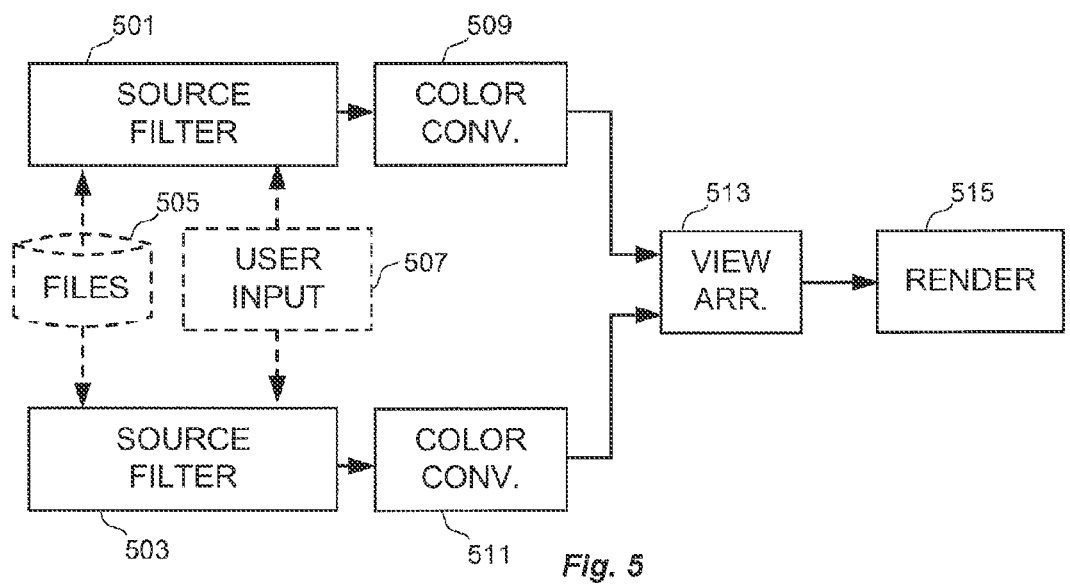

In FIG. 5, two source filters 501, 503 obtain data from a stereo pair of viewpoint files 505 and user input information 507 and provide data to two color conversion filters 509, 511. Data from the color conversion filters 509, 511 are provided to an view arranging filter 513 and further to a video rendering filter 515.

All viewpoint files 505, which are defined and provided to the source filters 501, 503 from an application program, are opened within the respective source filter 501, 503 using reading pointers. Only one viewpoint file is read at a time by each source filter.

All view point files are structured in the same way. Therefore, all view point files have the same amount of bytes and video frames are located at the same byte positions in all files. Therefore, it is only necessary to save the reading pointer of a current view point. When switching view point, this reading pointer will determine the starting position of the following file reading.

The file reading processes of the two source filters must be synchronized in time in order to provide a synchronized view switch between the two output view points. This synchronization could for example be implemented by letting the first source filter 501, be the master source filter and letting the second source filter 503, be the slave source filter. The file reading of the slave source filter is then synchronized to the file reading of the master source filter.

The source filters 501, 503 provide uncompressed video frames in 1420 color format (YV12). However, other uncompressed formats are of course also possible such as RGB16, RGB24, RGB32, UYVY, YUY2, YV16, etc. The uncompressed formats may be embedded in a container such as AVI or MKV.

Viewer or user input information 507, is collected within the source filters 501, 503 by means of a custom interface. The user input basically indicates the direction of the viewer/user movement (e.g. up/down, left/right, etc.) and/or the size of the resulting frame (e.g. zoom in/out, resizing, etc.) and/or change in stereo effects (e.g. change baseline between views by increasing/decreasing the distance or number of views between a pair of views, etc). The input may be obtained by means of a keyboard, mouse, other application (e.g. face/head/color tracking, etc.), etc.

Video frames are converted from 1420 to RGB 24 bits in the color conversion filters 509, 511. Also here, one can think of other uncompressed formats. If the source filters 501, 503 and the view arranging filter 513 accept the same format, the color conversion filters 509, 511 can be omitted.

In the view arranging filter 513, the video sequence stereo pairs are adapted to a display used for rendering. This filter provides a frame that is able to be rendered by a stereo display. The methods used by the view arranging filter 513 may be spatial interlacing or temporal interleaving, depending on the display on which the video is to be presented. Spatial interlacing may be made either vertically or horizontally.

Further interpolation or filtering may be required for the appropriate display of stereo pairs. Also synchronization between the two views of the stereo pair may be needed to prevent out-of-synch artefacts which may be visible if one of the views is lagging. This is achieved either by blocking the input pins of the filter and/or matching timestamps between the inputs.

The video rendering filter 515 may be the standard video rendering DirectShow® software provided by Microsoft®.

Figure 6:
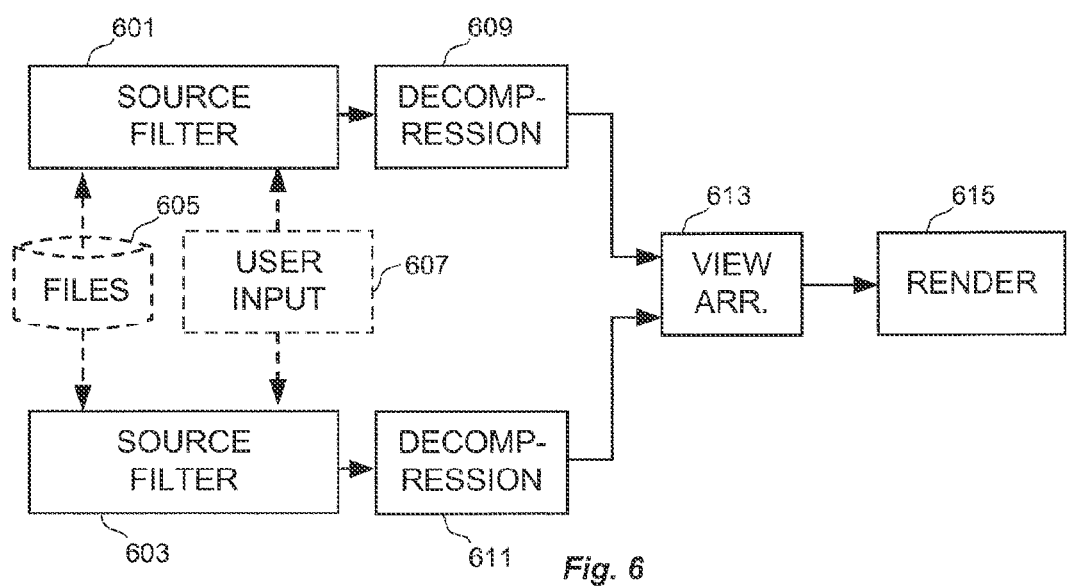

In FIG. 6, two source filters 601, 603 obtain data from a stereo pair of viewpoint files 605 and user input information 607 and provide data to two decompression filters 609, 611. Data from the decompression filters 609, 611 are provided to an view arranging filter 613 and further to a video rendering filter 615.

All viewpoint files 605, which are defined and provided to the source filters 601, 603 from an application program, are opened within the respective source filter 601, 603. Only one viewpoint file is read at a time by each source filter.

All viewpoint files 605 are structured in the same way in terms of resolution, frame rate and timestamps. The different frames may however have different byte sizes since the video data is compressed. For each viewpoint file loaded, the correspondence between the frame timestamp and the byte position within the file is established. In practice frame start codes are searched within each bit stream. In case interframe coding is used, i.e. compressed video data having I-, P- and possibly also B-frames, the correspondence between the frame time stamp and the byte position of the nearest previous I-frame within the file is established.

The result is a look up table to be used to determine the byte position to continue reading from during view switching. To save time at start-up, the look up table may be created in advance and stored in a file. Another alternative is to search and keep track on frame start codes in all files during playout. Yet an alternative solution involves that the byte position is searched for in run-time when a view switch is requested. In such a case, no look-up table is generated. To make the search faster, it can start from the current byte position of the previous view.

In any case, it is only necessary to save the timestamp of the current view point. When switching view point, the timestamp is used to obtain the byte position to start "reading" from the following viewpoint file or, in the case interframe coding is used, the byte position of the nearest previous I-frame.

The source filters 601, 603 provide compressed frames to the decompression filters 609, 611, whose characteristics depend on the compression method used. The decompression filters 609, 611 provide a data stream in an uncompressed format such as RGB24, which is used in the view arranging filter 613, which operates in the same way as described above in connection with FIG. 5.

The video rendering filter 615 may be the standard video rendering DirectShow® software provided by Microsoft®.

Figure 7:
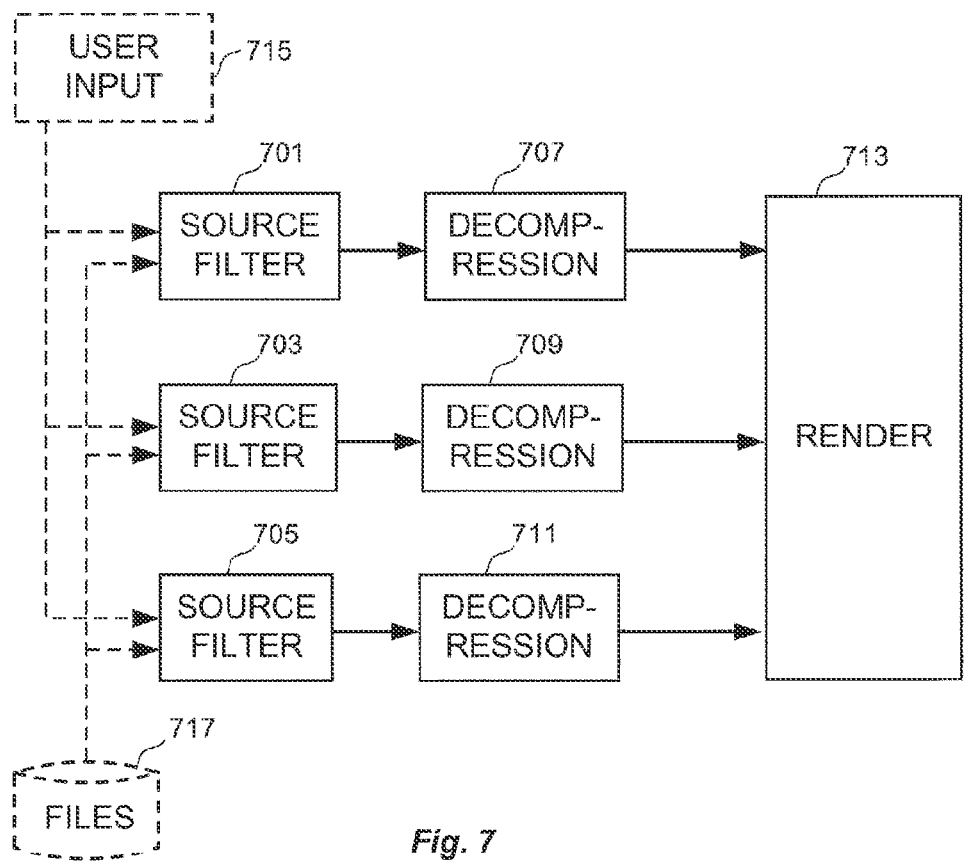

Whereas FIGS. 5 and 6 show 3D solutions that provide output to a viewer in the form of a stereo view, FIG. 7 illustrates the principles of an autostereoscopic video provider.

Autostereoscopy involves multiple output view points (more than two) that are a subset of the available input view points. Autostereoscopic display systems emit different view points in different viewing angles. When a viewer is moving from side to side, the views will change for each eye. An autostereoscopic display typically provides up to nine output views. FIG. 7 shows an example with three output views where source filters 701, 703, 705 obtain data from view point files 717 and user input 715, and performs decompression and rendering in filters 707, 709, 711 and 713 in a similar fashion as described above in connection with FIGS. 5 and 6.

With regard to the embodiments of FIGS. 5, 6 and 7, these are advantageous in that files are opened in a source filter. There is no need for multiple filters, which results in saving memory. Also there is no need for any additional filter. This reduces the complexity and increases the portability of the method. Reduced complexity is also obtained by noting that frames are continuously read and thereby removing any need to keep track of the current frame.

Figure 8:
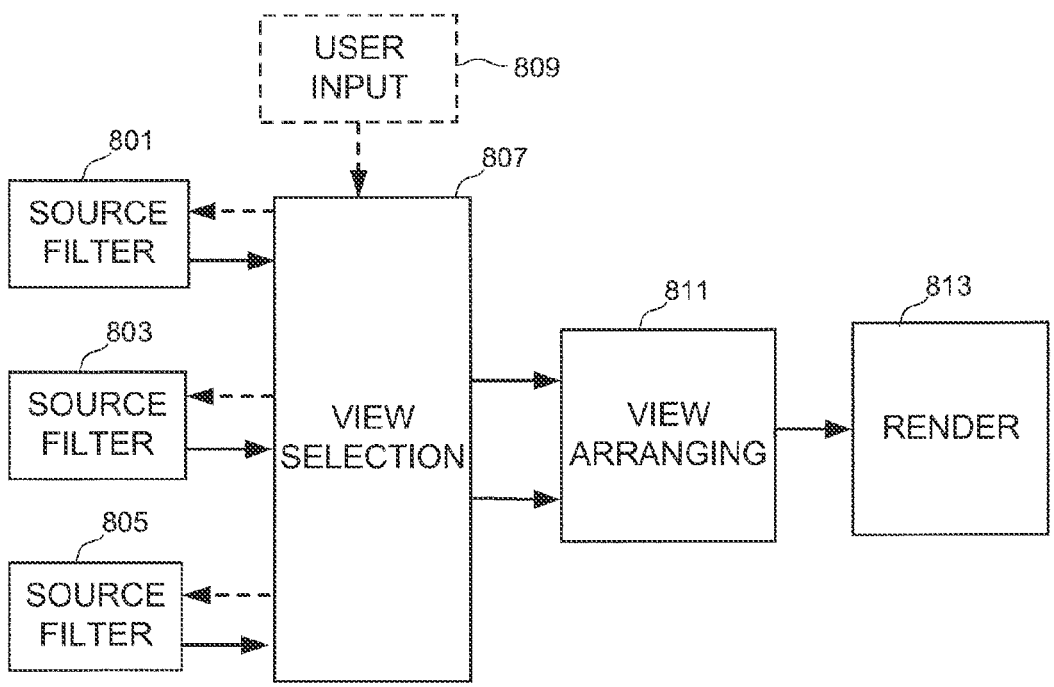

In FIG. 8, source filters 801, 803, 805 are connected to a view selection filter 807. Although only three source filters are shown, it is to be noted that any number, N, of source filters can be used. Each source filter 801, 803, 805 fetches view point video from respective view point files (not shown in FIG. 8) in the same way as described above in connection with FIGS. 5 to 7.

The view selection filter 807 also receives user input 809 and provides two output views points to form a stereo pair. The solid line arrows represent the flow of the video stream from the source filters 801, 803, 805. The dashed line arrows represent requests of view points and frames from the source filters 801, 803, 805.

Each source filter 801, 803, 805 reads from one input file containing one of the N view points. In order to enable handling of a large number of view points, the view points should ideally only be read upon request. An alternative would be to read an entire view point file into a memory and pick the requested frames from the memory. In the embodiment of FIG. 8, the view point files should contain uncompressed data such as YV12, UYVY, YUY2, YV16, RGB16, RGB24, and RGB32. The uncompressed data may also be contained in a container format, such as AVI or MKV.

The user input 809 connected to the view selection filter 807 is used to determine which of the input view points should be selected for the stereoscopic output. The user input may be obtained by means of keyboard, mouse, other software application such as face/head/color tracking, as discussed above.

The view selection filter 807 uses a pull mechanism to get the desired frames from the source filters 801, 803, 805 corresponding to the selected view points. This means that the view selection filter 807 keeps track on what frames (in terms of view points and timestamps) should be read, and requests the frames from the appropriate source filter 801, 803, 805. The source filter reads the frame from the file and sends it to the view selection filter 807. A way to implement this is to have an active thread in the view selection filter 807 for each corresponding source filter 801, 803, 805. The threads corresponding to the view points that are not selected are blocked until the view point is selected.

An view arranging filter 811 provides video frames that can be rendered by a stereoscopic display. The interlacing may be spatial interlacing or temporal interleaving, depending on the type of display that will receive the output frames from the view arranging filter 811. Spatial interlacing may be made either vertically or horizontally. Further interpolation or filtering may be required for the appropriate display of stereoscopic pairs of frames. Synchronization between the two views of the stereoscopic pair may also be needed to prevent out-of-synch artefacts which may be visible if one of the views is lagging. This may be achieved either by blocking the input pins of the view arranging filter 811 and/or matching timestamps between the input view points.

Although not shown in FIG. 8, a color conversion filter may be needed between the view selection filter 807 and the view arranging filter 811, if the color format given as output from the view selection filter 807 is not accepted by the view arranging filter 811.

A rendering filter 813 renders and displays the video as discussed above.

Figure 9:
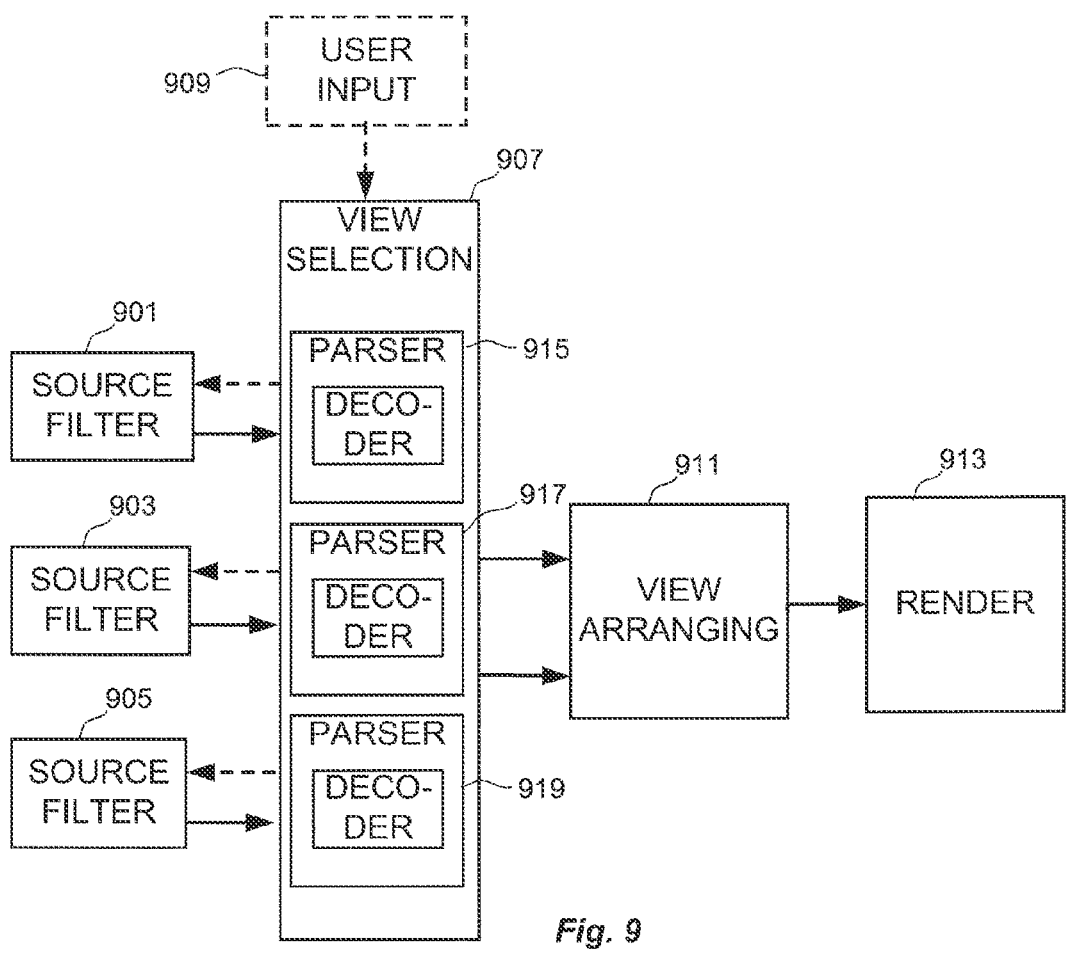

FIG. 9 illustrates an embodiment in which compressed data is read from the input view point files. As for the embodiment described above in connection with FIG. 8, source filters 901, 903, 905 are connected to a view selection filter 907. Although only three source filters are shown, it is to be noted that any number, N, of source filters can be used. Each source filter 901, 903, 905 fetches view point video from respective view point files (not shown in FIG. 9) in the same way as described above in connection with FIGS. 5 to 7.

The view selection filter 907 also receives user input 909 and provides two output views points to form a stereo pair. The solid line arrows represent the flow of the video stream from the source filters 901, 903, 905. The dashed line arrows represent requests of view points and frames from the source filters 901, 903, 905.

The source filters 901, 903, 905 read compressed video data from file such as, MPEG-2, MPEG-4 part 2 Visual, H.264 (a.k.a. MPEG-4 part 10 AVC), Motion JPEG, etc. The compressed video data may also be contained in container formats such as AVI and MKV.

With regard to compressed content, it is possible to distinguish between two cases. In the first case only intra frames (I-frames) are used, meaning that only the current frame is needed to decode the frame. In the second case predictive frames (P-frames and perhaps B-frames) are used as well. In both cases a decoder may be placed in or after the view selection filter 907. In FIG. 9 parser/decoder functions 915, 917, 919 are located within the view selection filter 907. However, it is possible to place a decoder after the view selection filter 907. In such a case, a parser located within the view selection filter 907 is still needed to parse the first couple of bytes of each frame to find out the byte size (and timestamp) of the frame to request from the appropriate source filter 901, 903, 905.

In the second case, i.e. where P-frames and perhaps B-frames are used, the view selection filter 907 may have to request video data for multiple frames if the decoding order is different from the presentation order or if a view switch is made between I-frames. In the latter case, all frames from the most recent I-frame in time must be requested to be able to decode the current frame properly.

It may take time to decode the video from the last I-frame to the current frame which in turn may introduce delay during view switching. To decrease this problem it is possible to decode video of neighboring view points in parallel as long as the processing power of the hardware platform on which the method is executed is sufficient.

A view arranging filter 911 and a rendering filter 913 renders and displays the video as discussed above.

Figure 10:
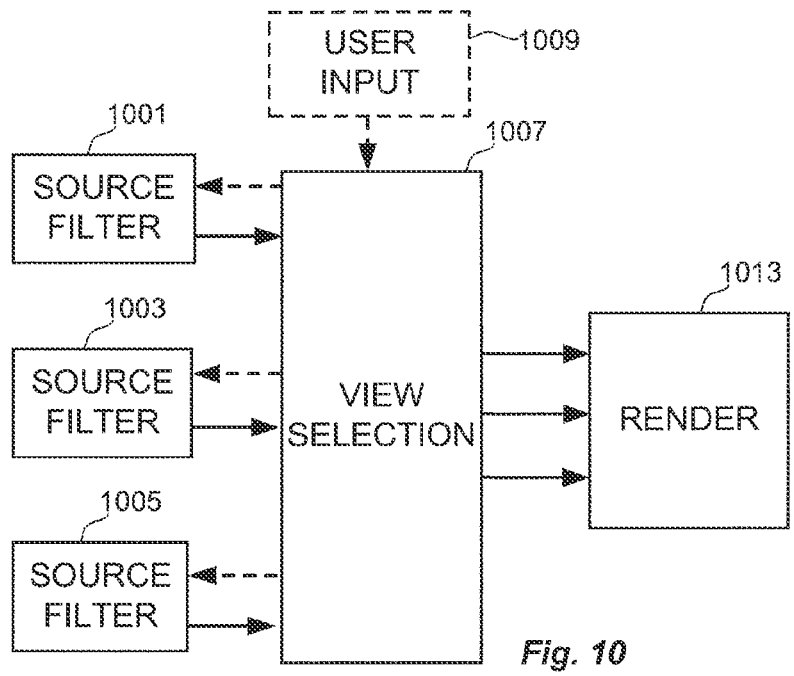

FIG. 10 illustrates an embodiment similar to that of FIG. 7, in the form of an autostereoscopic procedure. A view selection filter 1007 interacts, essentially as described above in connection with FIGS. 8 and 9, with source filters 1001, 1003, 1005, user input 1009 and a rendering filter 1013 in order to provide three output view points for an autostereoscopic display system.

With regard to the embodiments of FIGS. 8, 9 and 10, these are advantageous in that different types of source formats may be used at the same time for the different view points. Furthermore, it is easy to handle compressed content since the decoder is implemented in the view selector. Flexibility is provided in that different filters modules may be inserted between each source filter and the view selection filter. Examples of such modules may be color correction filters, geometry correction filters, etc.

Figure 11:
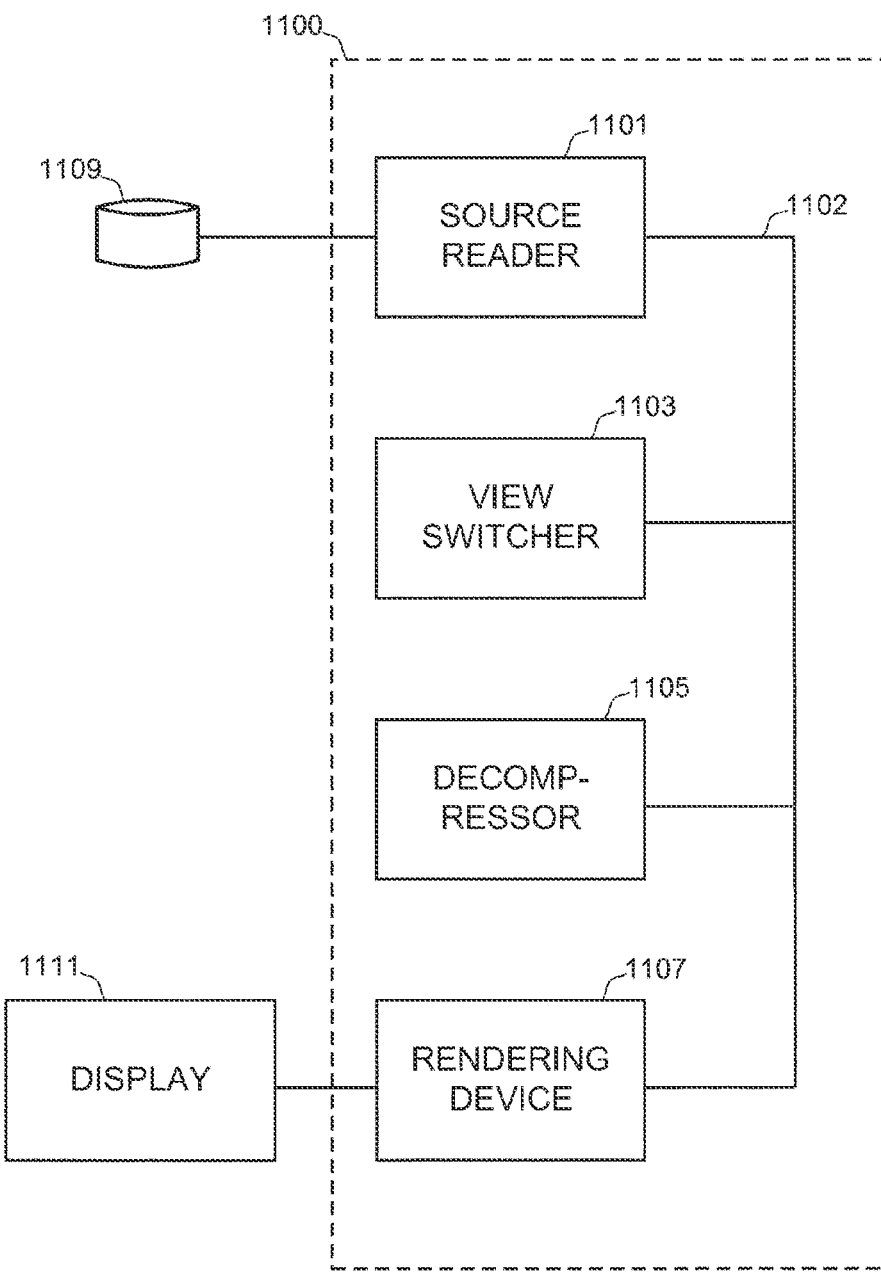
FIG. 11 is a block diagram that schematically illustrates hardware units in a video presentation system.

FIG. 11 is a block diagram that illustrates, schematically, an apparatus in which the methods described above may be realized. In contrast to the apparatus 100 of FIG. 1, which is divided into processing and memory circuitry units, the apparatus 1100 in FIG. 11 is defined in terms of separate function blocks connected via a bus 1102. Each function block is configured for a specific operation for performing control of video sequence presentation. That is, the apparatus 1100 comprises a source reader 1101 connected to view point files 1109, a view switcher 1103, a decompressor 1105 and a rendering device 1107 that is connected to a display 1111.

Some embodiments may involve situations where video sequence format and type of video sequence storage container differs between the first video sequence and the second video sequence.

The invention claimed is:

1. A method implemented by a video presentation system of controlling presentation of video sequences, each video sequence comprising a sequence of images of one and the same subject, each video sequence being associated with a respective view point and each video sequence being stored as viewpoint files in a respective video sequence storage container, the method comprising:

opening a first viewpoint file associated with a first view point by using a first reading pointer, opening a second viewpoint file associated with a second view point by using a second reading pointer, wherein the first viewpoint file and the second viewpoint file have the same amount of bytes and the video sequences are located at the same byte positions in the first viewpoint file and the second viewpoint file, obtaining images from a first video sequence stored in the first viewpoint file, providing the obtained images from the first video sequence for presentation, receiving viewer input information indicating a desire to present a second view point, in response to receiving the viewer input information, determining a start position within a second video sequence stored in the second viewpoint file, wherein the start position is determined to be the current byte position pointed by the second reading pointer, discontinuing, by the video presentation system, the obtaining of images from the first video sequence, as of the determined start position, while keeping the first viewpoint file opened by using the first reading pointer, obtaining images from the second video sequence associated with the second view point, starting from the determined start position, and providing the obtained images from the second video sequence for presentation.

2. The method of claim 1, comprising a first source processing process and a rendering process that are concurrently active, and wherein:

in the first source processing process, the images from the first video sequence are obtained, in the rendering process, the images from the first video sequence are rendered, in the first source processing process, the viewer input information is received, in the first source processing process, the viewer input information is analyzed and said start position is determined, in the first source processing process, the obtaining of images from the first video sequence is discontinued, in the first source processing process, the images from the second video sequence are obtained, and in the rendering process, the images from the second video sequence are rendered.

3. The method of claim 2, wherein each video sequence is in a compressed data format, wherein the method further comprises a concurrently active decompression process, and wherein:

in the first source processing process, the start position is determined by keeping track of frame time stamps in relation to byte positions within the video sequences, and in the decompression process, the images from the video sequences are decompressed and provided to the rendering process.

4. The method of claim 2, comprising:

at least a second source processing process concurrently active with the first source processing process, wherein first and second video sequences from the at least second source processing process are handled in the same way as first and second video sequences from the first source processing process, and a view arranging process in which the first video sequences from their respective source processing processes are arranged for 3D display prior to the rendering process, and in which the second video sequences from their respective source processing processes are arranged for 3D display prior to the rendering process.

5. The method of claim 4, wherein the view arranging process comprises any of: spatial interlacing, temporal interleaving, and arranging for auto stereoscopic display.

6. The method of claim 1, wherein each video sequence is in a compressed data format, and wherein:

in the view selection process, the start position is determined by keeping track of frame time stamps in relation to byte positions within the video sequences; and in the view selection process, the images from the video sequences are decompressed and provided to the rendering process.

7. The method of claim 1, wherein each video sequence is in a compressed data format, wherein the method further comprises a concurrently active decompression process, and wherein:

in the view selection process, the start position is determined by keeping track of frame time stamps in relation to byte positions within the video sequences; and in the decompression process, the images from the video sequences are decompressed and provided to the rendering process.

8. The method of claim 1, wherein a plurality of execution threads are active within the view selection process, the execution threads being configured to handle first and second video sequences according to the handling in the view selection process, and wherein the method comprises a view arranging process in which first video sequences from respective execution threads are arranged for 3D display prior to the rendering process, and in which second video sequences from respective execution threads are arranged for 3D display prior to the rendering process.

9. The method of claim 8, wherein the view arranging process comprises any of: spatial interlacing, temporal interleaving, and arranging for auto stereoscopic display.

10. The method of claim 1, wherein any of video sequence format and type of video sequence storage container differs between the first video sequence and the second video sequence.

11. The method of claim 1, wherein the reception of viewer input information comprises receiving information regarding a movement of the viewer.

12. A computer program product stored on a non-transitory computer readable medium and comprising software instructions that, when executed in a computer, cause the computer to control presentation of video sequences, each video sequence comprising a sequence of images of one and the same subject, each video sequence being associated with a respective view point and each video sequence being stored as viewpoint files in a respective video sequence storage container, wherein the software instructions cause the computer to:

open a first viewpoint file associated with a first view point by using a first reading pointer, open a second viewpoint file associated with a second view point by using a second reading pointer, wherein the first viewpoint file and the second viewpoint file have the same amount of bytes and the video sequences are located at the same byte positions in the first viewpoint file and the second viewpoint file, obtain images from a first video sequence stored in the first viewpoint file, provide the obtained images from the first video sequence for presentation, receive viewer input information indicating a desire to present a second view point, in response to receiving the viewer input information, determine a start position within a second video sequence stored in the second viewpoint file, wherein the start position is determined to be the current byte position pointed by the second reading pointer, discontinue the obtaining of images from the first video sequence, as of the determined start position, while keeping the first viewpoint file opened by using the first reading pointer, obtain images from the second video sequence associated with the second view point, starting from the determined start position, and provide the obtained images from the second video sequence for presentation.

13. An apparatus for controlling presentation of video sequences, each video sequence comprising a sequence of images of one and the same subject, each video sequence being associated with a respective view point and each video sequence being stored as viewpoint files in a respective video sequence storage container, the apparatus comprising processing circuitry and memory circuitry that are configured to:
   open a first viewpoint file associated with a first view point by using a first reading pointer,
   open a second viewpoint file associated with a second view point by using a second reading pointer,
   wherein the first viewpoint file and the second viewpoint file have the same amount of bytes and the video sequences are located at the same byte positions in the first viewpoint file and the second viewpoint file,
   obtain images from a first video sequence stored in the first viewpoint file,
   provide the obtained images from the first video sequence for presentation,
   receive viewer input information indicating a desire to present a second view point,
   in response to receiving the viewer input information, determining a start position within a second video sequence stored in the second viewpoint file, wherein the start position is determined to be the current byte position pointed by the second reading pointer,
   discontinue the obtaining of images from the first video sequence, as of the determined start position, while keeping the first viewpoint file opened by using the first reading pointer,
   obtain images from the second video sequence associated with the second view, starting from the determined start position, and
   provide the obtained images from the second video sequence for presentation.

14. The apparatus of claim 13, where the processing circuitry and memory circuitry comprise a source reader, a view switcher, a decompressor and a rendering device.

15. The method of claim 1, comprising a view selection process and a rendering process that are concurrently active, and wherein:
   in the view selection process, the images from the first video sequence are obtained from a first source processing process,
   in the rendering process, the images from the first video sequence are rendered,
   in the view selection process, the viewer input information is received,
   in the view selection process, the viewer input information is analyzed and said start position is determined,
   in the view selection process, the obtaining of images from the first video sequence is discontinued,
   in the view selection process, the images from the second video sequence are obtained from a second source processing process, and
   in the rendering process, the images from the second video sequence are rendered.

* * * * *